March 5, 1935.  G. H. FOURNIER  1,993,508
CARBON PILE REGULATOR
Filed Oct. 8, 1930   2 Sheets-Sheet 1
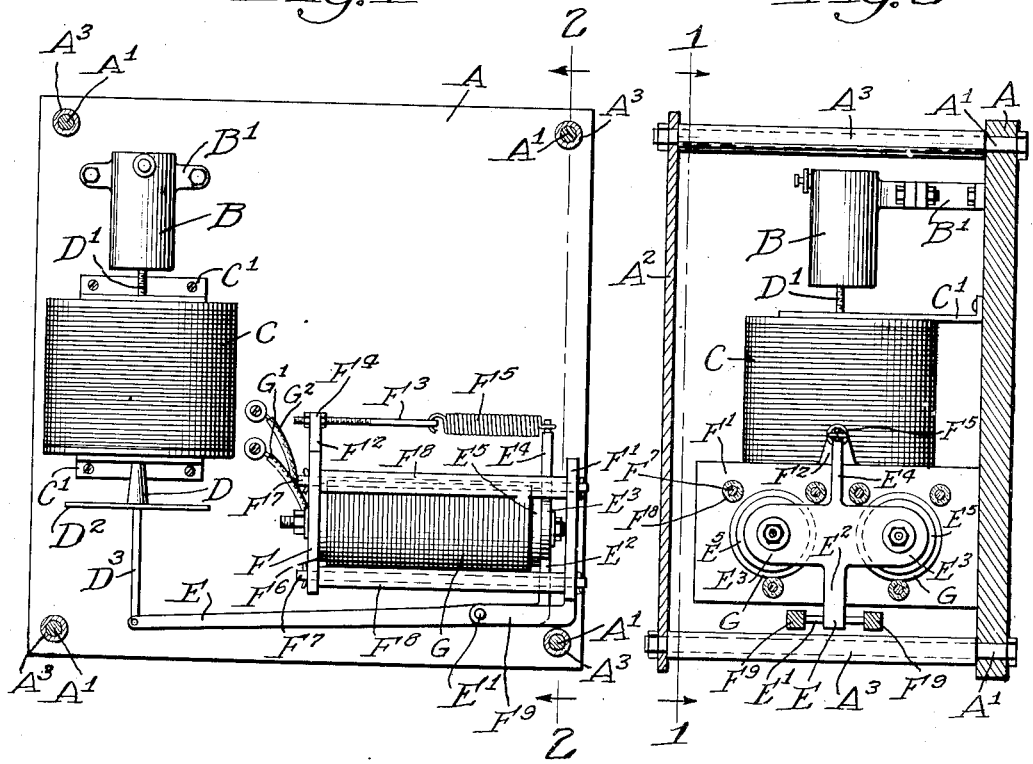
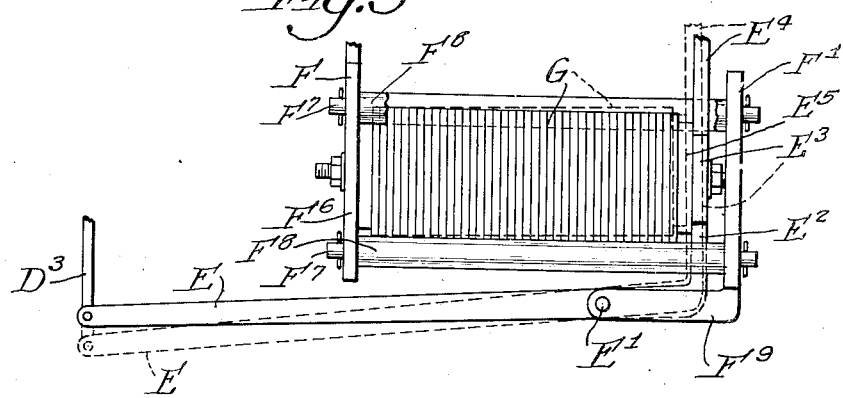
Inventor:
George H. Fournier
By Parker & Carter
Attys

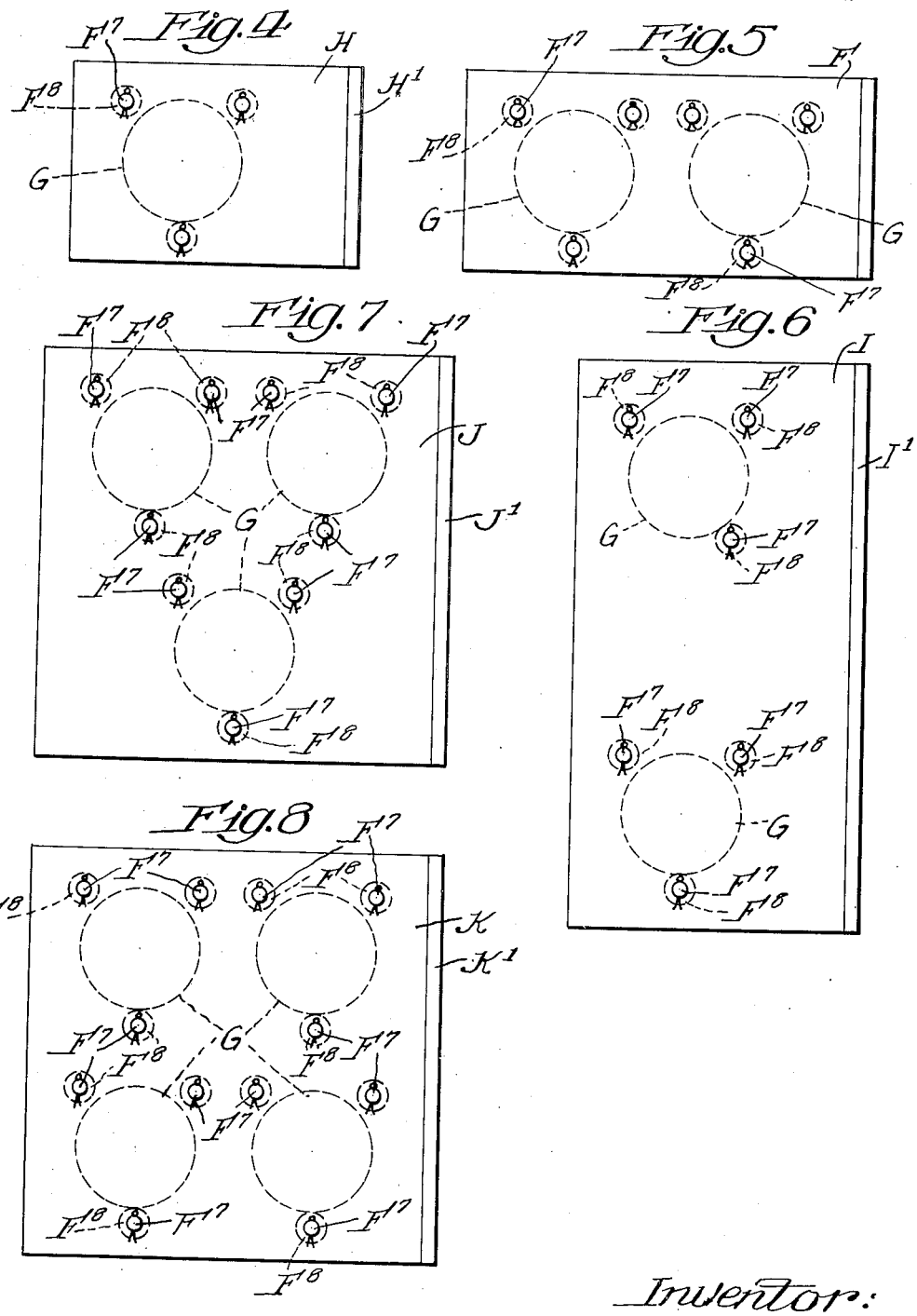

Patented Mar. 5, 1935

1,993,508

UNITED STATES PATENT OFFICE 1,993,508

CARBON PILE REGULATOR

George H. Fournier, Elkhart, Ind., assignor, by mesne assignments, to Eva L. Rous, Chicago, Ill.

Application October 8, 1930, Serial No. 487,236

5 Claims. (Cl. 201—51)

This invention relates to carbon pile regulators and has for its object to provide a new and improved device of this description.

One of the defects with the ordinary regulator now in use is that a considerable change in the current occurs before the regulator becomes effective, and hence the regulation becomes a step by step regulation, that is there is a change in the current and when this change reaches a considerable amount the regulator acts to bring the current back to the desired point. Furthermore, in such prior regulators, in view of the friction of the parts and other resistance which must be overcome before effective action on the carbon pile is produced, there is, in addition to the delayed action, a tendency to produce too great a movement of the carbon pile controlling mechanism after the movement has once started, thereby increasing the objectionable fluctuation. The result of such a regulator is that the evil which it is used to correct first occurs to a considerable amount, and then the device acts to remedy it.

One of the objects of the present invention is to provide a regulator which, instead of having this step by step action, that is instead of permitting the evil to occur to a considerable extent and then correcting it, will act so quickly and effectively as to prevent the evil from occurring, thereby maintaining a substantially constant current or potential instead of a fluctuating current or potential. This is of vital importance in this art.

The invention has as a further object to provide a regulator of this type by means of which the maximum of actuating energy for effective regulation is produced with a minimum loss in overcoming friction or other resistance to the regulating action.

The invention has as a further object to provide a carbon pile regulator arranged so that in action the carbon pile is moved upward from its bottom support to reduce the resistance to the relative movement of the plates of the carbon pile during the regulating action thereof. This is of vital importance in the art due to the fact that the forces employed in securing regulation are exceedingly limited and the slightest resistance due to friction or other causes interferes with the proper regulation to an extent altogether out of proportion to the friction or other resistance interposed in the system.

The invention has as a further object to provide a carbon pile with a single support at the bottom. The invention has other objects which are more particularly pointed out in the accompanying description.

Referring now to the drawings, Fig. 1 is a sectional view of one form of device embodying the invention taken at line 1—1 of Figure 2;

Fig. 2 is a transverse vertical cross section at line 2—2 of Figure 1;

Fig. 3 is a side elevation on an enlarged scale showing diagrammatically two positions of adjustment of the carbon pile and its controlling parts;

Fig. 4 is an end elevation showing a modified form of the frame member;

Fig. 5 is an end elevation showing the frame member of Figures 1, 2 and 3;

Fig. 6 is an end elevation showing a further modified form of frame member;

Fig. 7 is an end elevation showing a further modified form of frame member; and

Fig. 8 is an end elevation showing a further modified form of frame member.

Like parts are designated by like characters throughout the specification and drawings.

Referring now to the drawings. A indicates a panel upon which the apparatus is mounted. $A^1 A^1$ are cover bolts by means of which a cover $A^2$ is held in place. About the bolts $A^1$ tubular spacers $A^3$ may be positioned.

B is a dash pot fastened upon the panel by means of a support $B^1$. In the form shown I have used an inverted air dash pot, but any suitable type of dash pot might be used and might be held above or below the coil.

C is a coil or solenoid mounted upon the panel A by supports $C^1 C^1$.

Extending into the solenoid is a plunger D. it is preferably tapered, as shown in Figure 1, and is fastened to a connecting member $D^1$ which extends into the dash pot. $D^2$ is an armature plate fastened to and moving with the plunger D. $D^3$ is a member attached to the plunger D at one end and at its other pivotally attached to a long, rigid arm E which is pivotally mounted as at $E^1$. The arm E is provided with a bent portion $E^2$ and may have one or more laterally extending parts $E^3$. In the form here shown it carries additionally a further extension $E^4$. Fastened to the long, rigid arm, and preferably to the portions $E^3$, are insulating contact plates or members $E^5$ which contact the carbon piles in the manner which will be described below.

F $F^1$ are frame members fastened to the panel A. The member F may have a projecting part $F^2$ in which a spring retaining member $F^3$ is adjustably mounted, as at F⁴. A spring F⁵ may be fastened to the member F³ at one end, and at its other end it may be fastened to the member E⁴, of the long, rigid arm E. The spring and its supporting and mounting parts may be omitted in certain types of uses. Fastened to the member F may be insulating contact members F⁶ which are generally similar to the members E⁵. Extending between the frame members F, F¹ and joining them are guide rods F⁷. Insulating tubular spacers F⁸ may be positioned on them. Supported from, and preferably integrally with the frame member F¹ are two bearing supports F⁹ F⁹. They provide the pivotal support E¹ for the long, rigid arm E.

G G are piles of carbon discs. Two such piles are shown in the form of the device indicated in Figures 1 and 2. Each pile is positioned between one set of three insulating guide rods and bears at one end against the insulating contact member F⁶ and at the other end against the similar insulating contact member E⁵.

In the form shown in Figures 1 and 2, the two carbon piles are arranged in series, although they might be arranged in parallel. A wire G¹ is connected to one of the carbon piles. The carbon piles themselves are electrically connected to each other at their other ends and the wire G² is connected to the second carbon pile, thus a current passes through the two piles in series.

In the form shown in Figure 4, the frame member which furnishes the support for the carbon pile differs from that shown in Figures 1, 2 and 3 in that it is provided to carry only a single carbon pile. The frame member H may be provided with a laterally bent flange H¹ for attachment to a panel A. It supports three of the insulated guide rods F⁷, F⁸.

In Figure 5 an end elevation of the frame member F, as used in Figures 1, 2 and 3, is shown, but the upward extension or projection F², as shown in Figures 1 and 2, has been omitted in the showing of Figure 5.

In Figure 6 a frame member I is provided with a laterally bent flange I¹ for attachment to a panel A, and the frame member is arranged to take two carbon piles mounted one above the other. For each of these carbon piles three of the insulated guide rods F⁷ F⁸ are used. In the guide rod assembly for the upper carbon pile the lower or bottom guide rod is set somewhat to one side of a line drawn vertically through the center of the discs.

In Figure 7 the frame J, having laterally bent flange J¹ for attachment to the panel A, is shown. This frame is adapted to carry three carbon piles and for that reason has three sets of insulated guide rods F⁷, F⁸.

In Figure 8 a frame member K is shown, having a laterally bent flange K¹ for attachment to the panel A. The member K is adapted for use in installation in which four carbon piles will be used, mounted two on a lower level and two on an upper level. For this installation four sets of insulated guide rods F⁷, F⁸ are used.

In all of the forms of my invention illustrated herewith the carbon pile and the individual discs which make it up are out of contact with the upper insulated guide rods, and in each case the three guide rods are arranged so that one is at the bottom and two are at or near the top with a space above the carbons for the free action upward of the said carbon. It is not essential that the lower or bottom insulated guide rod be absolutely at the bottom of the carbon disc or discs which may rest upon it. Ordinarily this would be the case, but where conditions of design or mechanical convenience require it, the lower insulated guide rod may be moved. Such condition is shown in Figure 6. In Figures 4 to 8 inclusive the position of the carbon piles with respect to the insulated guide rods is indicated in dotted lines.

While I have called the members F⁸ supporting devices they may also be termed confining devices as they confine the carbon plates particularly during assembly and shipment.

The use and operation of my invention are as follows:

The device of my invention is used where it is desired to assure a constant voltage or constant current and to do so automatically and positively. The device of my invention may be used in many connections. It may be used as an automatic voltage control for alternating current or direct current. It may be used as a current control and in many other associations. Particular details of these various possible uses are not illustrated herewith, as the present invention deals more particularly with the structural features of the apparatus and particularly with the mounting and supporting of the carbon piles.

One mounting of the device in connection with a generator will be described merely as illustrative of a possible use. The device is associated with a generator. The main leads from the generator are connected to the load. The operating coil or solenoid C is connected to these main leads. A rheostat may be used in connection therewith. The carbon pile is connected with the field leads of the generator. This is true whether there is one carbon pile or more than one, and the piles may be arranged in series or in parallel. With the device associated with a generator as above suggested, the operation is as follows:

As the voltage of the generator increases for any reason above the predetermined figure, the current in the operating coil increases, thereby increasing the strength of the magnetic pull of the solenoid. This increased pull of the solenoid will cause the plunger to rise in the core of the solenoid. As the plunger rises, the pressure on the carbon piles is decreased through the system of pivots shown in Figs. 1 and 3. Decreasing the pressure on the carbon piles increases the resistance of the carbon piles. This resistance, being in series or shunt with the field of the generator, decreases the current in the generator field, thereby lowering voltage of generator. Should the generator voltage drop below the predetermined value, the strength of the magnetic field of the solenoid decreases, permitting the plunger to drop downwardly, and thereby, through the same system of pivots, it increases the pressure on the carbon piles which reduces resistance in the field circuit of the generator, thereby increasing voltage of the generator to the predetermined value.

When the carbon plates or discs are in contact with the lower support, the parts are as shown in full lines in Fig. 3. When the device is in operation, the parts are as shown in dotted lines in Fig. 3 with the plates or discs of the carbon pile slightly lifted from the lower support. The spring F⁵, when it is used, causes a maximum lift and the solenoid then acts, and the arrangement is preferably such that throughout the maximum movement of the solenoid and the lever E, when the device is in operation, the carbon plates or discs are out of frictional contact with the lower support, or they are in such a position as to reduce the frictional contact between the support and the carbon plates, as such plates or discs are moved by the action of the solenoid to decrease or increase the resistance to the current passing therethrough. The carbon pile, therefore, either in the direction of increasing compression or thereafter in the direction of decreasing pressure, is freed from friction with any of the guide rods, since they have been moved out of contact with the lower guide rod and have not been moved sufficiently upward to be in contact with any of the upper guide rods. Because there is only a single lower guide rod upon which the carbon pile rests at any time, no wedging or "butterfly" action of the individual carbon members or the carbon pile as a whole can occur upon the guide rod. Thus, by reason of the arrangement of the guide rods, movement of the carbon piles and of the individual members which make up the piles, is freed from friction and the danger of wedging or sticking is avoided and the movement of the carbon pile and the members which go to make it up is made more uniform and more accurately responsive to movement of the solenoid, and accordingly it is more uniformly, accurately and delicately responsive to variations in the voltage or current in the main line.

While I have shown at or near the bottom of each carbon pile only a single supporting member, and while ordinarily only a single member would be used, I do not wish to limit myself to the use of such a single member. A plurality of members might be used at or near the bottom of the carbon pile, provided their contacts with the carbon pile are so close together that the wedging action above discussed cannot take place.

As shown in Figures 1, 2 and 3, there are two carbon piles and the current passes through the two piles in series, forming a rheostat that varies its resistance proportionately to the variations in pressure applied by the member E acting under the changes occurring in the position of the plunger D, which plunger changes are caused by the fluctuations in current which flows through the solenoid C which is connected to the main line.

It will be seen that by means of this invention the fluctuations of the current or the voltage are prevented and accurate regulation secured. It will further be seen that the maximum of actuating energy effecting the regulation is utilized with a minimum of loss for overcoming friction or other non-regulating resistance.

I claim:

1. A regulator comprising a carbon pile made up of a series of carbon plates, a confining device therefor comprising a single longitudinal member of insulating material at the bottom of the pile, two members of insulating material, spaced apart, located at the top of the carbon pile, and means, acting when the regulator is in operation, for applying a lifting movement to the carbon plates to reduce the friction between them and the lower support and for varying the pressure between said carbon plates.

2. A regulator comprising a carbon pile made up of a series of carbon plates, an insulating supporting device therefor at the bottom of said carbon pile, an electromagnetic device for varying the pressure between the carbon plates, and means for applying a lifting pressure to the carbon pile during the regulating action so as to reduce the opposition of said insulating supporting device to the movement of said carbon plates in response to said electro-magnetic device.

3. A regulator comprising a carbon pile made up of a series of carbon plates, a non-conducting supporting device therefor at the bottom of said carbon pile, an electro-magnetic device for varying the pressure between the carbon plates, and means for applying a lifting pressure to the carbon pile during the regulating action so as to lift the carbon plates out of frictional contact with said support.

4. A regulator comprising a carbon pile made up of a series of carbon plates, a confining device for said carbon pile comprising a single longitudinal member extending along the bottom of the pile, and two longitudinal members extending along the top of the pile, an electromagnetic device for varying the pressure between said plates, and means for maintaining a portion of said carbon pile out of contact with the longitudinal member at the bottom of said carbon pile when the electro-magnetic device is in operation.

5. A regulator comprising a carbon pile made up of a series of carbon plates, a frame, a series of guide rods connected at each end with said frame and arranged around said carbon pile, one end of said pile engaging said frame, a contact member engaging the other end of the pile, a pivoted lever connected with said contact member, said lever being out of contact with said carbon discs at all times and an electromagnetic device acting upon said lever to move it in one direction and a spring acting upon said lever to move it in the opposite direction, the movement of said lever lifting said carbon pile so that it is out of contact with all of said guides when the regulator is in operation.

GEORGE H. FOURNIER.